(12) United States Patent
Sadeh

(10) Patent No.: US 9,875,348 B2
(45) Date of Patent: Jan. 23, 2018

(54) E-LEARNING UTILIZING REMOTE PROCTORING AND ANALYTICAL METRICS CAPTURED DURING TRAINING AND TESTING

(71) Applicant: Green Grade Solutions Ltd., London (GB)

(72) Inventor: Sharon Sadeh, London (GB)

(73) Assignee: Green Grade Solutions Ltd., London (GB)

( * ) Notice: Subject to any disclaimer, the term of this patent is extended or adjusted under 35 U.S.C. 154(b) by 418 days.

(21) Appl. No.: 14/336,521

(22) Filed: Jul. 21, 2014

(65) Prior Publication Data

US 2016/0019379 A1    Jan. 21, 2016

(51) Int. Cl.

| | |
|---|---|
| *G06F 21/32* | (2013.01) |
| *G09B 7/00* | (2006.01) |
| *G09B 7/02* | (2006.01) |
| *G06F 21/31* | (2013.01) |
| *G06F 21/50* | (2013.01) |
| *G09B 5/00* | (2006.01) |
| *G06Q 50/20* | (2012.01) |

(Continued)

(52) U.S. Cl.
CPC ............ *G06F 21/32* (2013.01); *G06F 21/316* (2013.01); *G06F 21/50* (2013.01); *G09B 7/00* (2013.01); *G09B 7/02* (2013.01); *G06Q 10/10* (2013.01); *G06Q 50/20* (2013.01); *G09B 5/00* (2013.01); *H04L 63/0861* (2013.01)

(58) Field of Classification Search
CPC .... G09B 7/00; G09B 7/02; G09B 5/00; G06F 21/32; G06F 21/316; G06Q 50/20; G06Q 10/10; H04L 63/0861

USPC ................. 434/350, 362; 340/5.83; 382/118
See application file for complete search history.

(56) References Cited

U.S. PATENT DOCUMENTS

| | | |
|---|---|---|
| 5,002,491 A | 3/1991 | Abrahamson et al. |
| 5,195,033 A | 3/1993 | Samph et al. |

(Continued)

OTHER PUBLICATIONS

Final Office Action issued in U.S. Appl. No. 11/853,463 dated Apr. 7, 2010, 7 pages.

(Continued)

*Primary Examiner* — Jack Yip
(74) *Attorney, Agent, or Firm* — Hirsch & Westheimer, PC

(57) ABSTRACT

A device configured to utilize training techniques and to gather information while training and administering certification examinations. Certification examinations may require security to ensure users taking the certification examination are actually the user designated on any issued certificate. When certification examinations are administered remotely from a proctor, different techniques to identify the user and attempt to guarantee that the user is not obtaining outside aid during the examination may be performed. Tests may be administered off-line while not connected to any network and locally cached data may be collected on the testing device for later transmittal to a back-end server for further analysis. In addition to remote proctoring/invigilating capabilities, the disclosed techniques and device may collect metrics that have a number of uses. For example, skill level of different geographical regions may be calculated to assist companies in determining a location for a new factory (e.g., assembly plant).

22 Claims, 7 Drawing Sheets

(51) Int. Cl.
*G06Q 10/10* (2012.01)
*H04L 29/06* (2006.01)

(56) References Cited

U.S. PATENT DOCUMENTS

| | | | |
|---|---|---|---|
| 5,310,349 A | 5/1994 | Daniels et al. | |
| 5,565,316 A | 10/1996 | Kershaw et al. | |
| 5,596,714 A | 1/1997 | Connell | |
| 5,823,788 A | 10/1998 | Lemelson et al. | |
| 5,827,070 A | 10/1998 | Kershaw et al. | |
| 5,909,589 A * | 6/1999 | Parker | G09B 5/065 712/32 |
| 5,915,973 A | 6/1999 | Hoehn-Saric et al. | |
| 6,112,312 A | 8/2000 | Parker et al. | |
| 6,141,528 A | 10/2000 | Remschel | |
| 6,149,441 A | 11/2000 | Pellegrino et al. | |
| 6,155,840 A | 12/2000 | Sallette | |
| 6,164,974 A | 12/2000 | Carlile et al. | |
| 6,208,832 B1 | 3/2001 | Remschel | |
| 6,476,806 B1 | 11/2002 | Cunniff et al. | |
| 6,688,889 B2 | 2/2004 | Wallace et al. | |
| 6,816,702 B2 | 11/2004 | Kuntz et al. | |
| 7,133,906 B2 | 11/2006 | Price et al. | |
| 7,343,134 B1 | 3/2008 | Ward | |
| 7,632,101 B2 | 12/2009 | Braunberger et al. | |
| 7,870,416 B2 | 1/2011 | D'Souza et al. | |
| 7,886,029 B2 | 2/2011 | Rogers et al. | |
| 8,219,021 B2 | 7/2012 | Rogers et al. | |
| 9,105,194 B1 * | 8/2015 | Kealey | G09B 7/00 |
| 2002/0032762 A1 | 3/2002 | Price et al. | |
| 2002/0034720 A1 | 3/2002 | McManus et al. | |
| 2002/0160347 A1 | 10/2002 | Wallace et al. | |
| 2002/0168621 A1 | 11/2002 | Cook et al. | |
| 2002/0172931 A1 | 11/2002 | Greene et al. | |
| 2003/0175676 A1 | 9/2003 | Theilmann et al. | |
| 2003/0175677 A1 | 9/2003 | Kuntz et al. | |
| 2003/0180703 A1 | 9/2003 | Yates et al. | |
| 2003/0232318 A1 | 12/2003 | Altenhofen et al. | |
| 2004/0115600 A1 | 6/2004 | Wasowicz et al. | |
| 2004/0148350 A1 * | 7/2004 | Lacy | G09B 7/02 709/205 |
| 2004/0229199 A1 | 11/2004 | Ashley et al. | |
| 2005/0003338 A1 | 1/2005 | Norcott et al. | |
| 2005/0102569 A1 | 5/2005 | Wu et al. | |
| 2005/0251363 A1 | 11/2005 | Turner et al. | |
| 2005/0268171 A1 | 12/2005 | House et al. | |
| 2005/0287509 A1 | 12/2005 | Mohler | |
| 2006/0014129 A1 | 1/2006 | Coleman et al. | |
| 2006/0035205 A1 | 2/2006 | Dobson et al. | |
| 2006/0101459 A1 | 5/2006 | Crosier et al. | |
| 2006/0112165 A9 | 5/2006 | Tomkow et al. | |
| 2006/0177803 A1 | 8/2006 | Pennington et al. | |
| 2006/0190871 A1 | 8/2006 | Likovich, Jr. et al. | |
| 2007/0040889 A1 | 2/2007 | Sahashi | |
| 2007/0099167 A1 | 5/2007 | Eason | |
| 2007/0107061 A1 | 5/2007 | Engle et al. | |
| 2007/0124726 A1 | 5/2007 | Qureshi et al. | |
| 2007/0220492 A1 | 9/2007 | Brugiolo et al. | |
| 2008/0096178 A1 | 4/2008 | Rogers et al. | |
| 2008/0104618 A1 | 5/2008 | Rogers et al. | |
| 2008/0108038 A1 | 5/2008 | Rogers et al. | |
| 2008/0133964 A1 | 6/2008 | Rogers et al. | |
| 2008/0276174 A1 | 11/2008 | Hintermeister et al. | |
| 2011/0171622 A1 * | 7/2011 | Lippert | G09B 7/00 434/362 |
| 2012/0176220 A1 * | 7/2012 | Garcia | G06F 21/32 340/5.83 |
| 2012/0244508 A1 | 9/2012 | Katz | |
| 2014/0030686 A1 * | 1/2014 | Stambaugh | G09B 7/06 434/322 |
| 2014/0157371 A1 * | 6/2014 | Le Chevalier | G06F 17/30563 726/4 |
| 2015/0037781 A1 * | 2/2015 | Breed | G09B 7/00 434/362 |
| 2015/0213722 A1 * | 7/2015 | Nypl | G09B 7/00 705/12 |

OTHER PUBLICATIONS

Final Office Action issued in U.S. Appl. No. 11/853,495 dated Mar. 31, 2010, 6 pages.
Final Office Action issued in U.S. Appl. No. 11/853,560 dated Apr. 1, 2011, 11 pages.
Final Office Action issued in U.S. Appl. No. 11/853,601 dated Feb. 16, 2011, 10 pages.
Final Office Action issued in U.S. Appl. No. 11/853,608 dated Feb. 16, 2011, 9 pages.
Non-Final Office Action issued in U.S. Appl. No. 11/853,445 dated Aug. 24, 2011, 8 pages.
Non-Final Office Action issued in U.S. Appl. No. 11/853,445 dated Nov. 5, 2010, 7 pages.
Non-Final Office Action issued in U.S. Appl. No. 11/853,463 dated Nov. 9, 2009, 6 pages.
Non-Final Office Action issued in U.S. Appl. No. 11/853,478 dated May 11, 2011, 8 pages.
Non-Final Office Action issued in U.S. Appl. No. 11/853,495 dated Sep. 25, 2009, 10 pages.
Non-Final Office Action issued in U.S. Appl. No. 11/853,543 dated Jun. 8, 2011, 8 pages.
Non-Final Office Action issued in U.S. Appl. No. 11/853,543 dated Sep. 29, 2010, 8 pages.
Non-Final Office Action issued in U.S. Appl. No. 11/853,560 dated May 26, 2010, 9 pages.
Non-Final Office Action issued in U.S. Appl. No. 11/853,584 dated Apr. 5, 2010, 5 pages.
Non-Final Office Action issued in U.S. Appl. No. 11/853,584 dated Jul. 21, 2011, 12 pages.
Non-Final Office Action issued in U.S. Appl. No. 11/853,601 dated Aug. 26, 2010, 8 pages.
Non-Final Office Action issued in U.S. Appl. No. 11/853,608 dated Sep. 23, 2010, 6 pages.
Non-Final Office Action issued in U.S. Appl. No. 11/853,619 dated Jun. 14, 2011, 8 pages.
Notice of Allowance issued in U.S. Appl. No. 11/853,463 dated Oct. 18, 2010, 4 pages.

* cited by examiner

E-LEARNING UTILIZING REMOTE PROCTORING AND ANALYTICAL METRICS CAPTURED DURING TRAINING AND TESTING

CROSS-REFERENCE TO RELATED APPLICATION

Not applicable.

STATEMENT REGARDING FEDERALLY SPONSORED RESEARCH

Not applicable.

BACKGROUND OF THE PRESENT DISCLOSURE

Technical Field

The present disclosure relates in general to e-learning environments in which network connections to external devices and networks are not present or not allowed. More particularly, but not by way of limitation, this disclosure pertains to techniques for remotely training and examining employees in safety and social compliance measures required to be compliant with safety and social compliance codes in factories of countries where limited network infrastructure (e.g., access to Internet) may pose a problem.

Description of Related Art

E-learning (or eLearning) refers to use of electronic multi-media and information and communication technologies (ICT) in education. E-learning includes but is not limited to: computer-based training (CBT), computer aided instruction (CAI), web-based training (WBT), on-line education and virtual classrooms. E-learning system may be configured to deliver text, audio, video (both downloaded and streaming), presentations, images, animations, etc. E-learning techniques have evolved with the growth of computer based learning systems and the widespread availability of the Internet. Today, people can receive an entire college education without ever being present in a traditional class room environment (i.e., an environment with an in-person instructor). Certification and proctoring (or invigilation) of tests is largely implemented via remote testing locations. A remote testing location can provide a variety of tests and typically has a human administrator that checks a test takers legal identification to ensure integrity of the examination process. Users are required to schedule a time to take an examination based on the working schedule of the remote testing location.

E-learning techniques also include standard computer based training (CBT) where an end-user has access to course material and practice exams. Most CBT systems do not provide a certificate of completion and are therefore more "honor system" based. However, some users require a certification to prove that they have mastered the subject matter of the course. These certifications may be useful to the user as an aid with obtaining employment or progressing in a career. Examples of such certifications include but are not limited to: a Patent Agent Certificate, a paralegal certification, a Project Management Professional Certification (PMP), and any of the various information technology (IT) Microsoft® Certified Professional (MCP) certifications. (Microsoft is a registered trademark of Microsoft Corporation, Redmond Wash.).

Systems configured to more fully automate the training and examination of workers that provide a certification with impeccable integrity and accuracy are needed. More specifically, there is a need for tablet computers, smart phones, personal digital assistants (PDAs), and other remote portable computer devices that may be configured to provide comprehensive training and learning material, track training and learning metrics, and certifiable examination results when not connected to any outside network or when no access to the Internet is available. Further, particular problems in training and testing workers in remote or disconnected locations may also relate to: a) ensuring that these assessments are secured more effectively; and b) that the data gathered on whether or not people reach a particular level of expertise or competency is accurate. This problem may be particularly difficult to solve when the training and tests are performed remotely from the authority that certifies and administers the tests. Improving security and data accuracy is required under these circumstances.

SUMMARY OF THE EMBODIMENTS

In accordance with the disclosed embodiments, e-learning devices and techniques for use in developing countries to train employees about safety and social compliance in a factory are described. The concepts of this disclosure may also be used to generally train less educated individuals by making the learning process more enjoyable while still maintaining integrity throughout the learning process. Often, large multi-national corporations source goods such as ready-made garment from factories in developing countries that employ semi-skilled but not necessarily well educated factory workers. Safety compliance and compliance with standards for working conditions are an important consideration for corporations. This is because the possibility of exposure of inappropriate working conditions may have a future negative impact on the image and sales of the corporation. For example, human rights activists have publicized corporations that employ child labor in their factories and have unsafe or unsanitary work environments. The disclosed embodiments may also be useful in continuing learning education (CLE) requirements across a number of industries. The security aspects or the disclosed embodiments explained in more detail below may make such embodiments useful for any kind of training and assessment that requires authentication of the person completing the training.

According to a first set of related aspects of at least one disclosed embodiment, there is provided a portable computer system configured with multiple question banks A user of the device may train by answering questions from a first question bank presented to the user in a random order. The device may be configured to track progress of the user relative to competency of subject matter relating to particular one or more certification examinations. Once the user is determined to have a threshold level of proficiency the system may prompt the user to take a formal certification examination. The certification examination may be timed and remotely proctored. Remote proctoring of the certification examination may include periodically, randomly, and intermittently utilizing any available capability of the training device. Such as, front camera, rear camera, microphone, global positioning system (GPS), quick response (QR) code reader, barcode reader, fingerprint reader, and so on to collect information. The collected information may or may not be collected at a set period and may be randomly and intermittently collected such that the user is unaware of when information is being collected by the training device. Users are typically made aware of and have provided consent regarding biometric, audio, and visual data gathering prior to the commencement of learning process.

According to a second set of aspects of at least one disclosed embodiment, metric data collected during training tests may be used as a validation against formal examination results. For example, if a user was regularly slow in finishing practice questions or was relatively inaccurate in practice test responses, then that same user would not be expected to perform quickly on the formal examination with high accuracy. Of course, that would not necessarily be a final determination but may be used as an indication to increase the amount of remote proctoring activity for a given formal examination in an effort to determine if cheating may be taking place.

According to a third aspect of at one least disclosed embodiment, all training and formal examination may take place while the training device is not connected to a network. The device may be pre-configured with all necessary information (e.g., software and multiple question banks) required to provide the training and formal examination process. The device may locally cache and encrypt practice test results, formal examination results, authentication information, and remote proctoring data. The remote proctoring data may be uploaded to a back-end server at a later time for more complete analysis prior to issuing any formal certificate.

According to a fourth aspect of at least one disclosed embodiment, a device configured according to the one or more disclosed embodiments may be configured to utilize the GPS of the device to determine movement of the device. Alternatively or additionally, location information may be later collected, correlated, and analyzed to determine geographical regions having a higher density of certified potential workers. This information may allow for a company to determine a location to build a factory where skilled workers are readily available.

According to other aspects of the disclosed embodiments, methods of providing a comprehensive e-learning system in an environment without network connectivity and collecting analytical metrics regarding interaction with the e-learning system are provided and further described in the detailed description below.

BRIEF DESCRIPTION OF THE DRAWINGS

The following figures form part of the present specification and are included to further demonstrate certain aspects of the present claimed subject matter, and should not be used to limit or define the present claimed subject matter. The present claimed subject matter may be better understood by reference to one or more of these drawings in combination with the description of embodiments presented herein. Consequently, a more complete understanding of the present embodiments and further features and advantages thereof may be acquired by referring to the following description taken in conjunction with the accompanying drawings, in which like reference numerals may identify like elements, wherein:

DETAILED DESCRIPTION OF ONE OR MORE EMBODIMENTS

Figure 1:
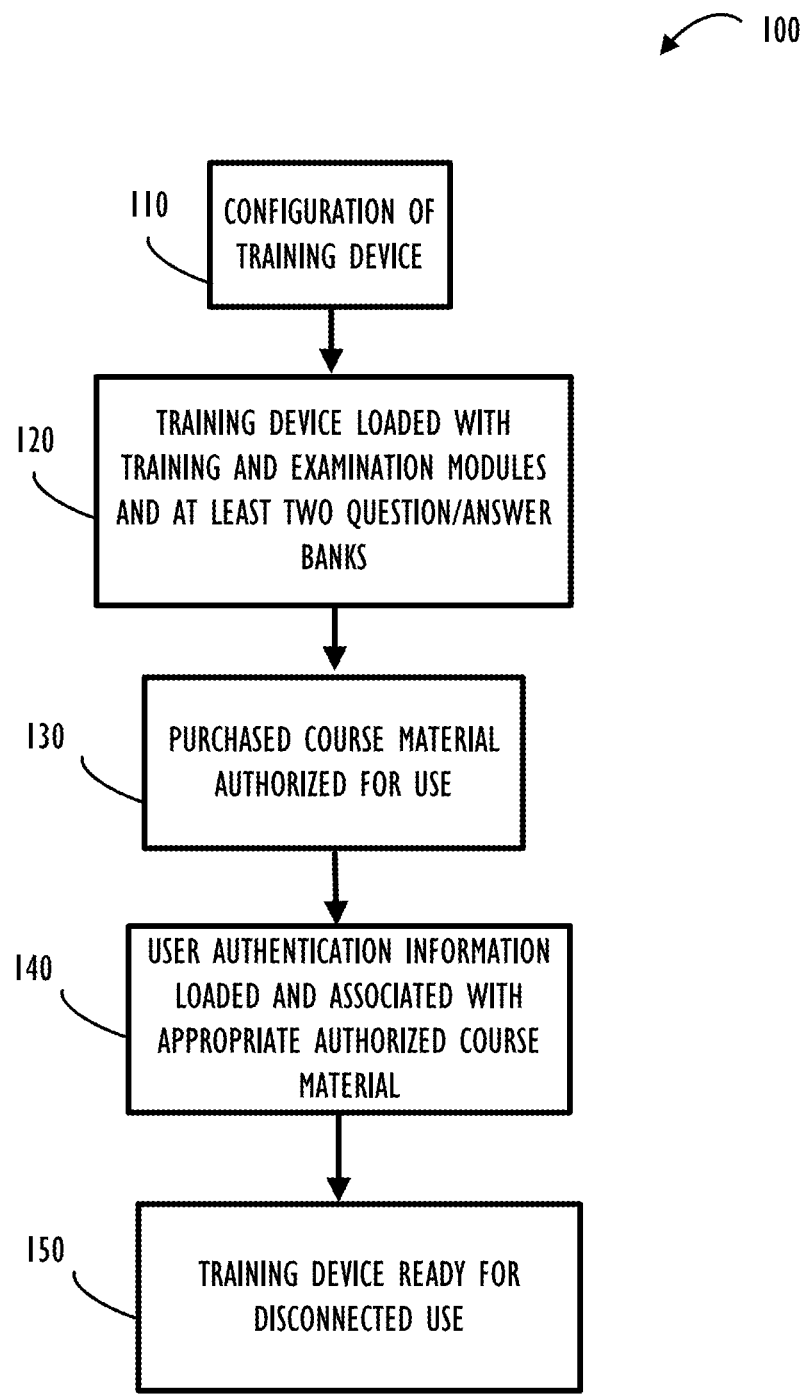
FIG. 1 illustrates a flow chart describing a process for a training device to be configured for an end-user in accordance with some embodiments of the present disclosure.

The foregoing description of the figures is provided for the convenience of the reader. It should be understood, however, that the embodiments are not limited to the precise arrangements and configurations shown in the figures. Also, the figures are not necessarily drawn to scale, and certain features may be shown exaggerated in scale or in generalized or schematic form, in the interest of clarity and conciseness.

While various embodiments are described herein, it should be appreciated that the disclosed embodiments encompass many inventive concepts that may be embodied in a wide variety of contexts. The following detailed description of example embodiments, read in conjunction with the accompanying drawings, is merely illustrative and is not to be taken as limiting the scope of the invention, as it would be impossible or impractical to include all of the possible embodiments and contexts in this disclosure. Upon reading this disclosure, many alternative embodiments will be apparent to persons of ordinary skill in the art. The scope of the invention is defined by the appended claims and equivalents thereof.

Illustrative embodiments of this disclosure are described below. In the interest of clarity, not all features of an actual implementation are described in this specification. In the development of any such actual embodiment, numerous implementation-specific decisions must be made to achieve the design-specific goals, which will vary from one implementation to another. It will be appreciated that such a development effort, while possibly complex and time-consuming, would nevertheless be a routine undertaking for persons of ordinary skill in the art having the benefit of this disclosure.

With regard to terminology, this disclosure relates to proctoring an examination to verify that no cheating is taking place and the person performing the training/examination session has a confirmed identity. In the United States the person performing this function is typically called a "Proctor." However, in some locations, particularly the United Kingdom, the term invigilator is used to refer to this function. Accordingly, the terms proctor and invigilator may be used interchangeably throughout this disclosure to convey the function of insuring integrity (either through manual or automated means) of a training or examination session to prevent cheating.

Further, the use of the term "preferable" or "preferably" is to be understood as indicating, inter alia, that the stated matter need not be as stated and that alternatives and contraries to the stated matter may be obtained, unless indicated otherwise. For example, if it were stated that a widget preferably has a certain characteristic (e.g., a component is preferably inclined at a certain angle, or two components preferably correspond in a certain manner, etc), it is thereby indicated that the widget may also not have the certain characteristic, may have a different or contrary characteristic, etc., unless indicated otherwise. In this regard, it may be the case that, within a given embodiment, an element may not be able to have a contrary characteristic, but that in a different embodiment, the element may have the contrary characteristic. Nonetheless, unless indicated otherwise, different embodiments are combinable with one another (combinations of more than two embodiments being possible), and any number of features of different embodiments are combinable with one another.

This disclosure relates to techniques to utilize a device configured to perform training and to gather information while training Although not limited to a single embodiment, for simplicity and ease of understanding, this disclosure will describe a device and techniques to train a factory worker such that the factory worker may assist in maintaining compliance to rules and regulations required at the factory. In some situations the factory may be in a less developed part of the world where full-time and comprehensive network infrastructure (e.g., the Internet) may not exist. To that end, the described embodiment includes details allowing the device to be substantially pre-configured and fully functional with respect to the e-learning function while not connected to any network. It should be noted however, that having available network infrastructure will not limit the capabilities of the disclosed device and techniques. One of ordinary skill in the art, given the benefit of this disclosure, would understand various implementations are possible in a fully connected environment, a partially connected environment, or a completely isolated environment. Functions performed when no network access is available may have their results and other metadata cached locally (e.g., stored in local memory/disk of the training device) until such time as a network connection is available and then be uploaded to a backend server, for example, to undergo further analysis.

The disclosed device and techniques are useful not only for training but also to securely administer certification examinations even with no Internet connectivity. Certification examinations require security to ensure that the user taking the certification examination is actually the user designated on any issued certificate. When certification examinations are administered remotely without a proctor/invigilator, multiple techniques to identify the user and attempt to guarantee that the user is not cheating may be implemented. Tests may be administered off-line while not connected to any network. The locally cached test data may be collected on the testing device for later transmission to a back-end server for further analysis. In addition to remote proctoring and training capabilities, the disclosed techniques and device may collect metrics that have a number of uses. For example, skill level of different geographical regions may be calculated to assist companies in determining a location for a new factory.

In different embodiments, the disclosed device may be a tablet computer, smart phone, personal digital assistant, laptop computer, etc. In some embodiments a tablet computer may be configured with an operating system (e.g., Android) and one or more functional modules and programs to facilitate the disclosed training/examination techniques. Embodiments may also be implemented on hardware of varying capabilities. Hardware with additional functionality may allow the disclosed techniques to be implemented in different ways. Because a large number of devices configured for training/examination may be required at a factory, it may be desirable to utilize a "lowest" cost hardware device capable of performing required functions. The structure, configuration and operation of training devices according to some embodiments will be described with reference to the figures. Referring to FIG. 1, process 100 illustrates a possible configuration of a training device according to the one or more disclosed embodiments. Starting at block 110, a device may be configured utilizing any available network or loaded from one or more computer readable media storage devices (e.g., flash drive, DVD, or CDROM). At block 120, the training device is loaded with training and examination modules (e.g., computer programs or plug-ins to computer programs) along with at least two separate banks of questions and answers. A first bank of questions and answers may be utilized for training and mock examination functions while a second bank of "secure" questions may be utilized for the formal examination. In this way, a user may be prohibited from memorizing answers through repetition and encouraged to understand the underlying subject matter. At block 130, specifically purchased training modules on the training device may be unlocked and made accessible to one or more users for use on the training device. Of course, unlocking of training modules would depend on a sales model for training capabilities and could be omitted or implemented in a number of different ways. At block 140, user authentication information may be loaded on the training device to facilitate later accurate determination of which user completes the training and examination functions. Authentication of users may be an important aspect of the disclosed embodiments to ensure that certifications are properly attained and associated with specific individuals. In one example, a personalized QR code may be printed on a sticker and given to a particular individual as an access key. The QR identification may be associated with a specific individual and incorporated with registration information on the training device such that an authentication process may include QR identification as opposed to (or in addition to) entering a user password. This may minimize the risk of unauthorized password sharing.

According to some disclosed embodiments, correct identification of users and their training/testing sessions is important to maintain accuracy of collected analytical metrics as described in more detail below. At block 150, the training device may be considered configured and ready for use by one or more users in an environment with no Internet connectivity. The training device may be configured to associate an International Mobile Equipment Identity (IMEI) number with a particular user or purchased set of training materials. The IMEI number may be used as an input key to an algorithm to generate a user-specific alpha-numeric activation code. Activation codes identify a unique user and may be added to each user's profile. Activation codes are useful during the user's first-time registration and may be used to activate applications and training/examination sessions included in a training device's pre-installed software. Activation codes are for one time use and are specific to particular users. Therefore, if a user needs to reset his or her password, the user will be required to submit to an Administrator both the IMEI number and the activation code. Any subsequent request by a user for additional activation codes—for example, if the user claims that it was lost prior to the completion of the registration process—may be noted under the user's profile with the details of the newly generated code. The old and the newly issued activation codes are only associated with that person, and even if they were shared with another person without permission, the on-boarding process as well as the intermittent image capturing during practice and exam may be used to identify and flag a possible mismatch between the original user and the other unauthorized user. In this manner, a training device may be usable across a set of users over a given time period. All information stored locally may be individualized. Individualized information may be uploaded when a connection to a back-end server is available. The described synchronization and upload of training, security, and analytical information may take place for information pertaining to each of the plurality of users of the training device. It should be recognized that any information stored locally on the training device may be encrypted or obfuscated for increased security and integrity using any known encryption/obfuscation techniques.

Figure 2:
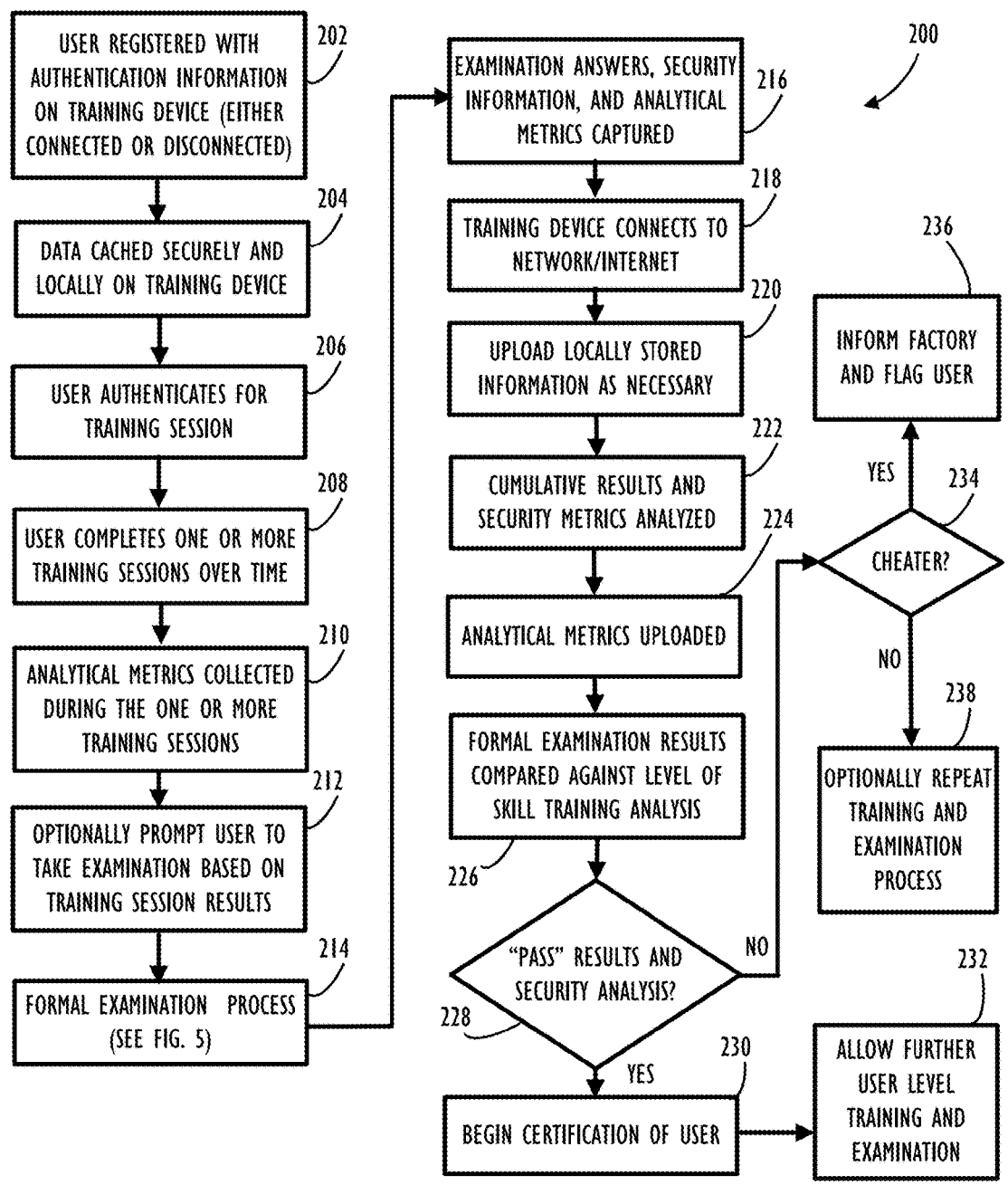
FIG. 2 illustrates a flow chart of an end to end process for user training and examination in accordance with some embodiments of the present disclosure.

Referring now to FIG. 2, process 200 illustrates an overview of a user training and examination process in accordance with one or more disclosed embodiments. Details of specific portions of process 200 will be described below with reference to FIGS. 3-5. Beginning at block 202, registration information for a user is made available on a training device (e.g., as in block 140 of FIG. 1). Block 204 indicates that the registration information may be stored locally on the training device from a system of known integrity. For example, information from a corporate database that indicates the identity of an employee or information from a government issued identification card (e.g., passport) may be potential sources for registration information. As implemented in the embodiments of the disclosed apparatus and system, registration may be performed initially and the user may then later authenticate a plurality of times against the locally stored registration information. Next at block 206, a user may authenticate themselves for a training session. Authentication may include making a QR code accessible at the training device and capturing an image of the user at the time of session initiation. The image may be automatically analyzed using facial recognition for comparison against a registration photo of the particular user. Alternatively or additionally, the image may be stored along with other security information related to one or more training sessions and later uploaded to a backend server for further analysis. At block 208, a user may complete one or more training sessions over time with authentication being repeated at the beginning of each new session and optionally periodically while a user is completing a training session. Block 210 indicates that analytical metrics may be collected during the one or more training sessions. Analytical metrics, as used herein, are different from but associated with security identification metrics and may be analyzed across a plurality of users to provide useful information to test administrators, factories, or retailers etc. for current and future training purposes. Additionally, analytical metrics can have their own value across different industries to assist in potential business opportunities and social improvement opportunities for different areas based on demographic and other determinable factors. Analytical metrics will be described in more detail below. Training sessions may be provided at a gradually accelerated pace and based on accuracy of answers, both of which aspects may be governed through a game layer embedded into the practice stage. Once achieving satisfactory knowledge and speed levels, the user may then be given a recommendation to take either the mock examination or a formal examination. The prompt for examination may be based, at least in part, on an expectation of success on the recommended examination (block 212). The game layer may be configured to provide an accelerated pace during the pre-exam stage and the system may reward both for right answers (through a points or token system) and how quickly correct questions were answered. The reward system may acknowledge a user by awarding the user a faster moving vehicle (e.g., status icon) as the user goes along. For example a user may receive a rickshaw icon which gradually turns into a faster vehicle such as sport car or Formula 1 race car to acknowledge the user. The faster the user answers questions correctly, the better the reward icon. These aspects may provide an incentive for users to compete with their peers to achieve higher status in a friendly competition such as playing a game while learning. Additionally, by prompting to take mock or formal examinations, a well prepared user may complete a training curriculum more quickly. In alternative embodiments, a user may be required to complete a pre-determined number of hours or a pre-determined number of training scenarios prior to being permitted to proceed to a formal examination for certification.

At block 214 a user may enter the formal examination process (described in more detail below with respect to FIG. 5) to complete a formal examination. During the formal examination process, examination answers, security information, and analytical metrics may be captured (block 216). At completion of the formal examination process, once the training device connects to an authorized network or the Internet at block 218, information stored on the training device while in disconnected mode may be uploaded (e.g., synchronized) at block 220 for additional backend analysis. At block 222, cumulative results of practice sessions and metrics collected during any examinations (e.g., both mock and formal) may be analyzed. Analysis of formal examination metrics may include at least one or more of: grading of the formal examination answers, correlation of metrics related to training sessions and mock examinations, and interrogation of security metrics to determine possible cheating. At block 224 analytical metrics collected during training sessions and examinations may be uploaded for future analytical analysis. The analytical analysis may be performed using information collected from a plurality of training devices. At block 226 a comparison of projected competence of a particular user and analysis of security metrics for that user may provide an indication of possible cheating during the formal examination process. For example, if a user performed poorly in previous training/examination sessions and then suddenly passes a formal examination, an increased scrutiny of the user may be required. At decision 228, a passing grade and acceptable security analysis (YES prong) allows flow to continue to block 230 to provide a certification for the passing user. Flow may then continue to block 232 where the newly certified user may continue with further training in a subject matter field because of their successful pre-requisite certification. Alternatively, if decision 228 results in a NO condition, flow may continue to decision 234 where the system may determine that the user possibly cheated. If it is determined there is an indication of cheating (YES prong of 234), flow may continue to block 236 where the factory is informed and the user is flagged as a known cheater. If block 234 results in an indeterminate indication or a NO (e.g., the analysis is not 100% conclusive, is determined to be in error, or the user simply failed the formal exam), flow may continue to block 238 where the user may be allowed to repeat the training and examination process.

As described above a tablet computer or personal training device may be configured to allow individual training/examination sessions. In one possible alternate embodiment, a computer configured to act as a server may be provided to a factory or other training location and tablet or personal computers can interact with the computer configured to act as the server. In this embodiment, the server computer may collect and store the authentication, security, and analytical information. At the end of a pre-determined period, the computer configured to act as the server may be taken from the training location and relocated to have access to the one or more back-end computers for analysis of collected data. In this embodiment, a specific training location may not be required to attain sophisticated network connectivity with respect to transferring information to the one or more back-end computers. Further, because of physically relocating the computer configured to act as a server, the overall security of any stored data may be increased.

Figure 3:
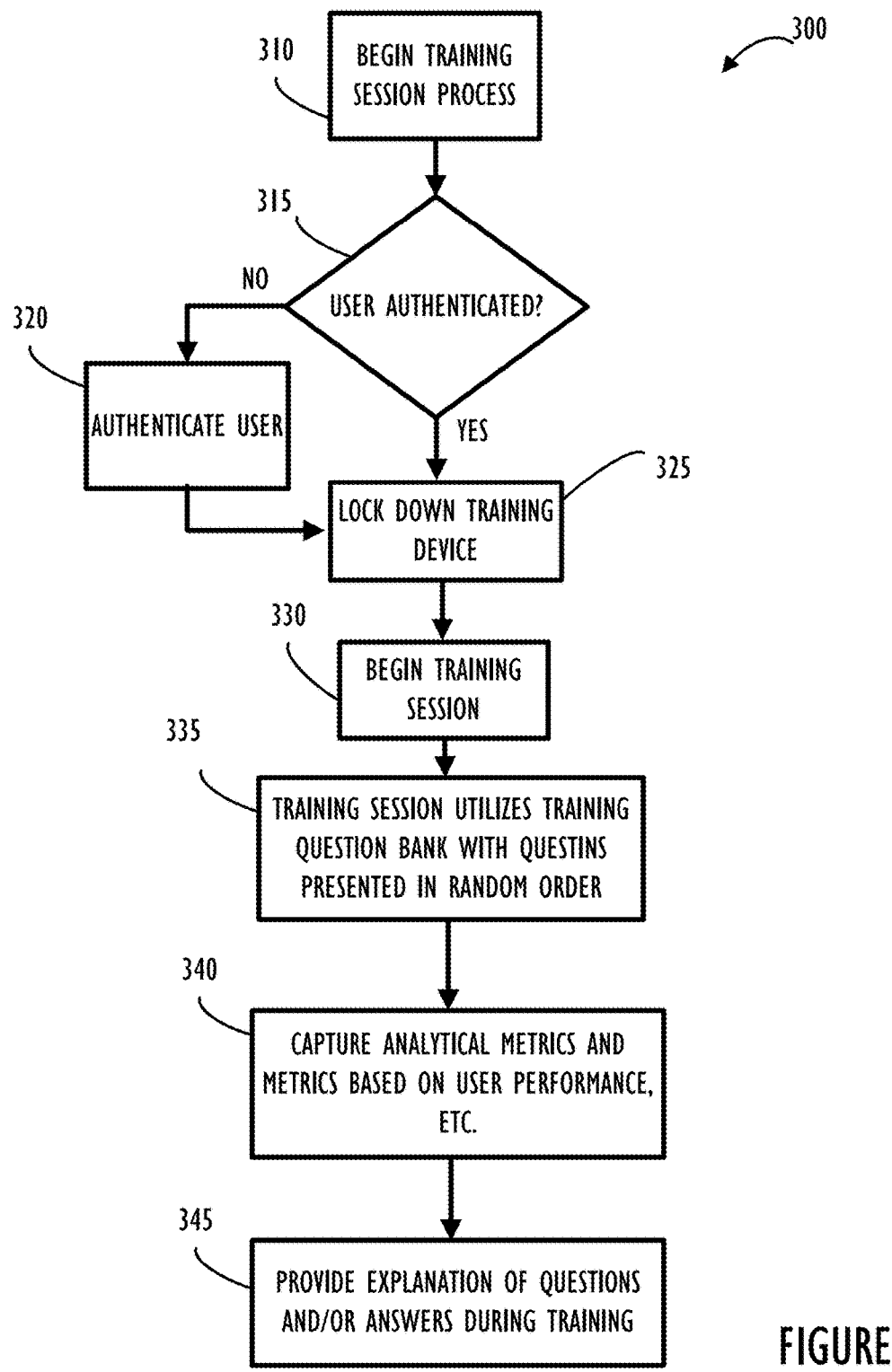
FIG. 3 illustrates a flow chart of a possible training session according to some disclosed embodiments.

Referring now to FIG. 3, process 300 illustrates a possible flow for a user training session. Beginning at block 310, a training session may be initiated by a user with the training device in disconnected mode. At decision 315, the system may determine if the user has authenticated to the training device. As described above, authentication of a user to a training device may include comparing information provided by a user at the disconnected training device with information previously securely stored locally (via a registration configuration process) on the training device. If the user is not authenticated (NO prong of 315), flow may continue to block 320 where an authentication process may be performed. In general, an authentication of a user may utilize biometric and other user specific data made available at user registration and include: taking a picture of the user and using face recognition to compare against a photo stored at registration, recording a voice sample and using voice recognition to compare against information stored at registration, obtaining a QR code or barcode via a camera or code reader of the training device, entry of a password, entry of fingerprint, entry of a cryptographic key, or a combination of theses along with other known techniques in the art of authentication. An important aspect of authentication according to the disclosed embodiments is to make sure a user is not falsifying their identity when performing any training or examination sessions. Thus, for example, the system could identify when a user is authenticating and then allowing another person to perform the session. One solution is to require periodic authentication during a training/examination session. At block 325, the training device may optionally be "locked down," for example, by disabling access to other available applications and by turning off any available external sources of information such as communication ports, network interfaces, and Universal Serial Bus (USB) ports. At block 330, a training session may begin. Block 335 indicates that during a training session, questions may be selected from a training question bank and provided to a user in a random order. Thus, each training session (and examination session) may present a unique experience such that it is unlikely that two users receive questions in a similar order. Questions from a training question bank will not be presented during a formal examination process; however, questions covering substantially similar subject matter may be pulled from a secure examination question bank and presented in a randomized order. During a training session, analytical metrics, metrics based on user performance relative to answers, and other metrics may be captured (block 340). Block 345 indicates that during a training session, as opposed to examination sessions, an explanation of questions, their answers, and further information about the subject matter of a particular question may be made available to a user to assist in their learning of that subject matter. One overall goal of a training session is to educate the user on the subject matter. Additionally, training devices configured according to one or more disclosed embodiments may capture metrics to track user performance and analytics. User performance metrics may be used to later determine an indication of cheating, etc. Analytical metrics may be used to determine demographic information, or information of a commercial value, etc. One example of analytical metrics may be to provide an indication that more fire safety equipment or training is needed in a particular geographical region because a larger number of users from that region are incorrectly answering questions about fire safety as compared to users from another region. Another example may be to gather a "star" rating for different factories. The "star" rating may allow retailers to place orders from higher rated factories or geographical regions and reduce their risk relative to supplier quality, conformance with safety regulations, and other factors.

Figure 4:
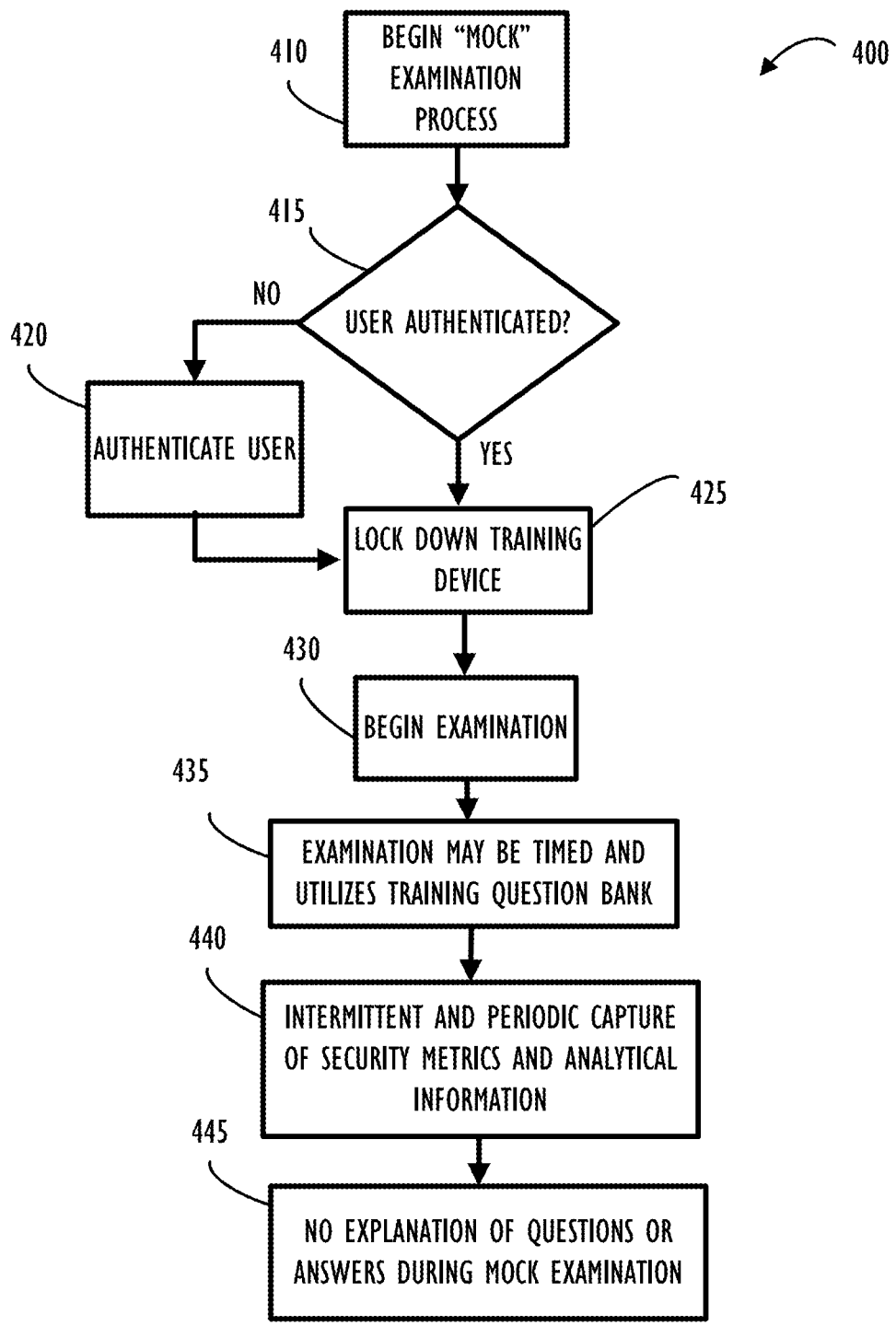
FIG. 4 illustrates a flow chart of a possible mock examination session according to some disclosed embodiments.

Referring now to FIG. 4, process 400 illustrates an example "mock" examination process. Mock examination process 400 begins at block 410 and user authentication determination is performed at block 415. User authentication determination 415 may be substantially the same as that performed for training sessions (block 315 of FIG. 3) although there may be slight variations based on a different level of integrity required for each increasing level of importance. Similarly, authentication process 420 and locking down of a training device 425 may be similar to but slightly more restrictive than that of blocks 320 and 325 respectively. At block 430, a mock examination may begin and be timed while still utilizing a training question bank as shown at block 435. Alternatively, a mock examination may utilize another question bank separate from the training question bank and the formal examination question bank. Block 440 indicates that during a mock examination there may be intermittent and periodic capture of security and analytical metrics. Security metrics are not necessarily captured during training sessions. Security metrics can include but not be limited to: a) monitoring via the training devices microphone to determine if audible voices are present, b) taking pictures from the training devices front or rear camera to determine if additional people are present, c) taking a picture from a front facing camera of the training device to confirm the authorized user is using the training device, and d) noting the physical location of the device through embedded GPS apparatus. Block 445 indicates that no explanation of questions or answers is provided during the timed mock examination process. This is because one goal of the mock examination process is to provide an environment similar to the formal examination process so that a user may become familiar with the formal testing process and be more comfortable during the formal examination for certification.

Figure 5:
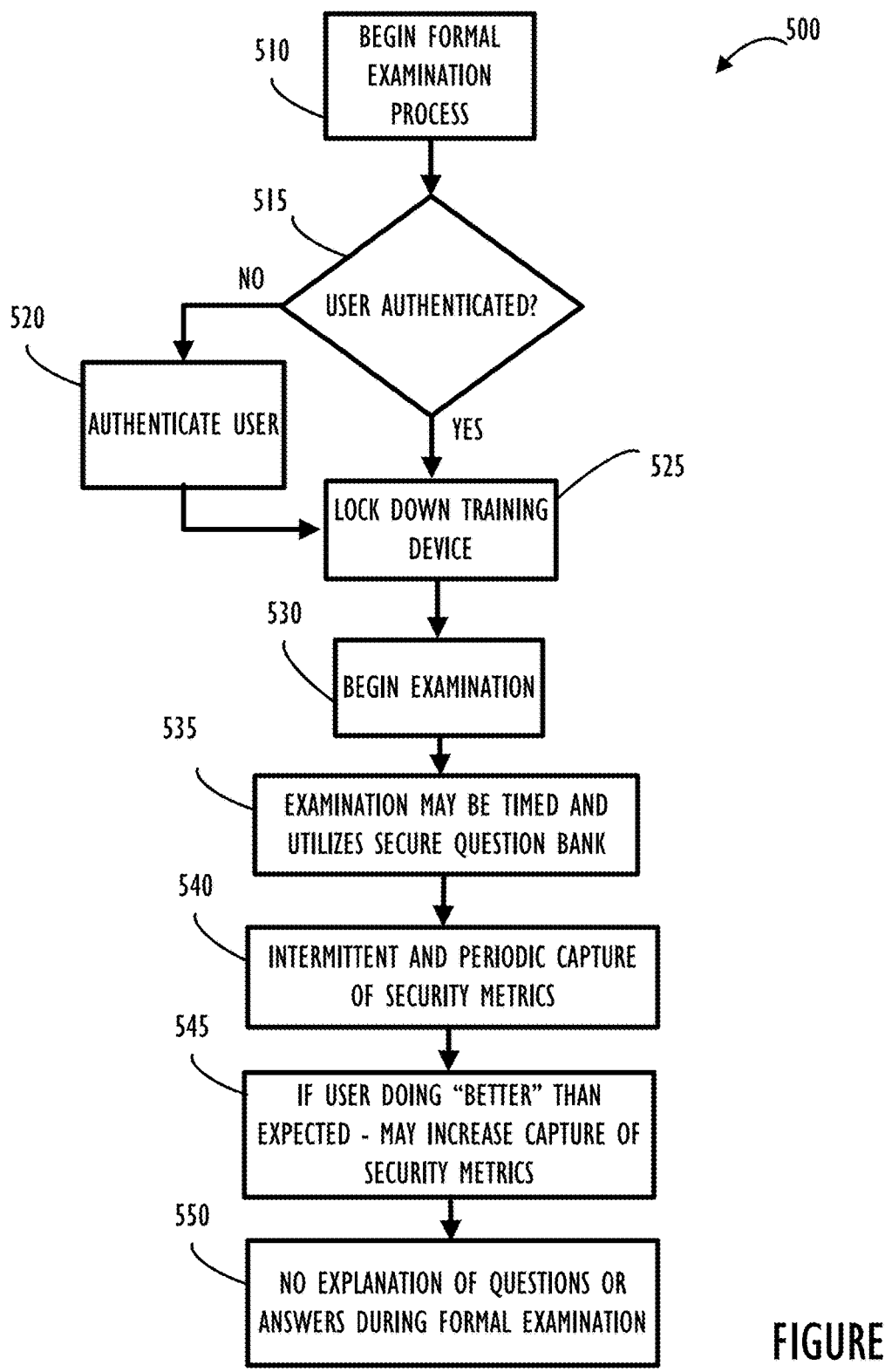
FIG. 5 illustrates a flow chart of a formal examination process according to some disclosed embodiments.

Referring now to FIG. 5, process 500 illustrates a formal examination process similar to the mock examination process 400. However, the formal examination process but provided via a more tightly controlled "formal" examination process. Formal examination process 500 includes blocks 510, 515, 520, and 525 which may be substantially similar to but more sophisticated than corresponding blocks 410, 415, 420, and 425 for the mock examination process described above. The formal examination begins at block 530. Block 535 indicates that a formal examination may be timed and, according to some embodiments, may utilize questions from a secure question bank that were not utilized in any previous training session or mock examination process. A formal examination process may be required to provide a pre-determined set of questions for each of one or more different subject matter areas as may be defined by a certification criteria. Intermittent and periodic capture of security metrics similar to those explained above with respect to block 440 of FIG. 4 may be captured as indicated at block 540. Block 545 indicates that analysis may be performed to determine if a user is doing better than expected and increase capture of security metrics. For example, if a user was not performing well on previous training or mock examination questions and is now answering questions correctly and efficiently, increased scrutiny through collection of more security metrics is desirable. Block 550 is similar to block 445 and indicates that no explanation of questions or answers is provided during the timed formal examination process. In each of the training session as well as the mock/formal examination process, questions may be presented in a random order so that each user may receive a unique presentation of subject matter. The random presentation of questions may help to maintain integrity of the respective training/examination session when multiple people are training in close proximity to each other.

As explained briefly above, different analytical metrics can be obtained throughout a user's participation in training and examination processes provided by the disclosed training device. Information about which training questions were answered correctly in a particular geographic region may be determined. Information about completed training/examination sessions across a plurality of users may be collected. By analyzing which users are spending more time on particular questions or subject material, further analytical information may be obtained. Geographical areas requiring different types of training or other demographic information (e.g., lack of knowledge concerning prevention of gender discrimination) may be identified. The identification may be used to facilitate additional training in those geographic areas for a particular subject matter. This information, while not strictly pertinent to the training/examination process, may be useful to factory owners and other suppliers to satisfy different business goals. Other areas where analytical information or the disclosed training device may be useful include: a) in-store training of staff in a multi-national retail chain to increase compliance with company policies and other needs; b) health and safety of food preparation requirements for restaurants or food processing facilities; c) targeted marketing of services based on gathered analytical and demographic metrics; or d) selling of information to a plurality of secondary markets that may benefit from the gathered metrics.

Figure 6:
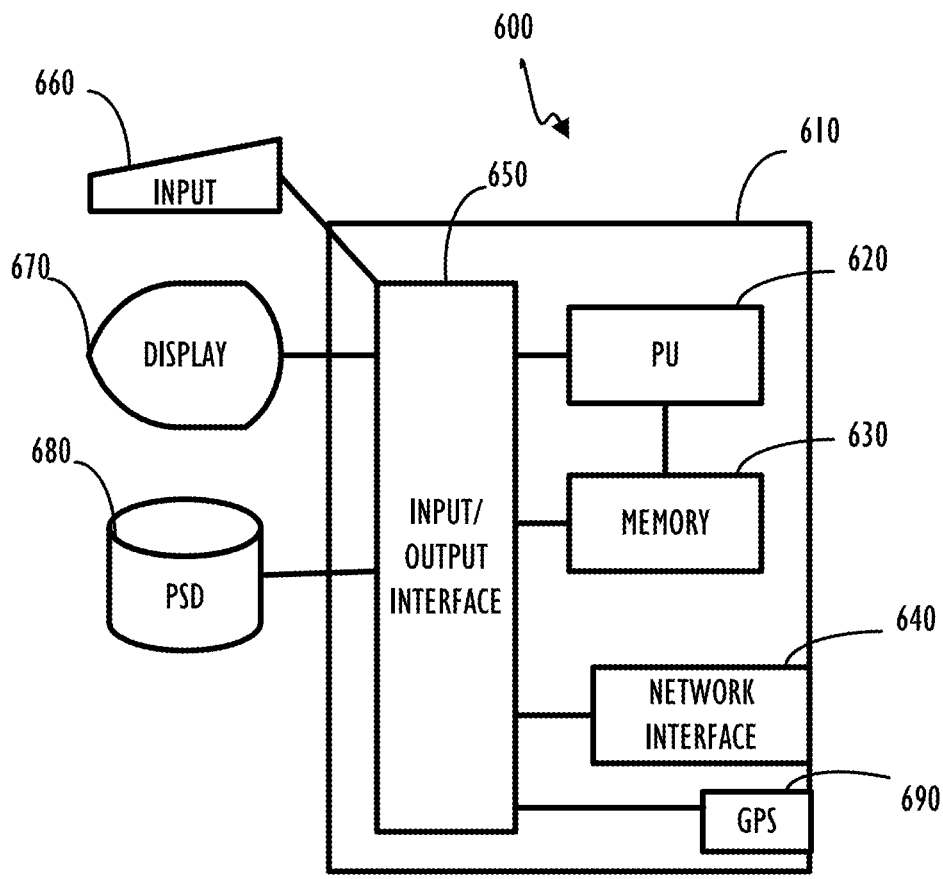
FIG. 6 illustrates a block diagram of a processing device and possible peripherals to facilitate configuration and operation of a training device configured according to some disclosed embodiments.

Referring now to FIG. 6, possible internals and peripheral components of an example training device 600 are shown. Example training device 600 comprises a programmable control device 610 which may be optionally connected to input 660 (e.g., keyboard, mouse, touch screen, etc.), display 670 or program storage device 680. Also, included with programmable control device 610 is a network interface 640 for communication via a network with other computers and infrastructure devices (not shown). As explained above, network interface 640 may be inoperative or not connected to a network when training device 600 is operating in disconnected mode. Note network interface 640 may be included within programmable control device 610 or be external to programmable control device 610. In either case, programmable control device 610 may be communicatively coupled to network interface 640. Also, note program storage device 680 represents any form of non-volatile storage including, but not limited to, all forms of optical and magnetic storage elements including solid-state storage. Training device 600 may also include a global positioning system (GPS) component 690 capable of identifying a location of training device 600 when the GPS function is active.

Program control device 610 may be included in a training device 600 and be programmed to perform methods in accordance with this disclosure (e.g., those illustrated in FIGS. 1-5). Program control device 610 comprises a processor unit (PU) 620, input-output (I/O) interface 650 and memory 630. Processing unit 620 may include any programmable controller device including, for example, the Intel Core®, Pentium® and Celeron® processor families from Intel and the Cortex and ARM processor families from ARM (INTEL CORE, PENTIUM and CELERON are registered trademarks of the Intel Corporation. CORTEX is a registered trademark of the ARM Limited Corporation. ARM is a registered trademark of the ARM Limited Company). Memory 630 may include one or more memory modules and comprise random access memory (RAM), read only memory (ROM), programmable read only memory (PROM), programmable read-write memory, and solid state memory. One of ordinary skill in the art will also recognize that PU 620 may also include some internal memory including, for example, cache memory.

Various changes in the materials, components, circuit elements, as well as in the details of the illustrated operational methods are possible without departing from the scope of the following claims. For instance, acts in accordance with FIGS. 1-5 may be performed by a programmable control device executing instructions organized into one or more modules (comprised of computer program code or instructions). A programmable control device may be a single computer processor (e.g., PU 620), a plurality of computer processors coupled by a communications link or one or more special purpose processors (e.g., a digital signal processor, DSP). Such a programmable control device may be one element in a larger data processing system such as a general purpose computer system. Storage media, as embodied in storage devices such as 680 and memory internal to program control device 610, are suitable for tangibly embodying computer program instructions. Storage media may include, but not be limited to: magnetic disks (fixed, floppy, and removable) and tape; optical media such as CD-ROMs and digital video disks (DVDs); and semiconductor memory devices such as Electrically Programmable Read-Only Memory (EPROM), Electrically Erasable Programmable Read-Only Memory (EEPROM), Programmable Gate Arrays and flash devices. These types of storage media are also sometimes referred to as computer readable medium or program storage devices.

Figure 7:
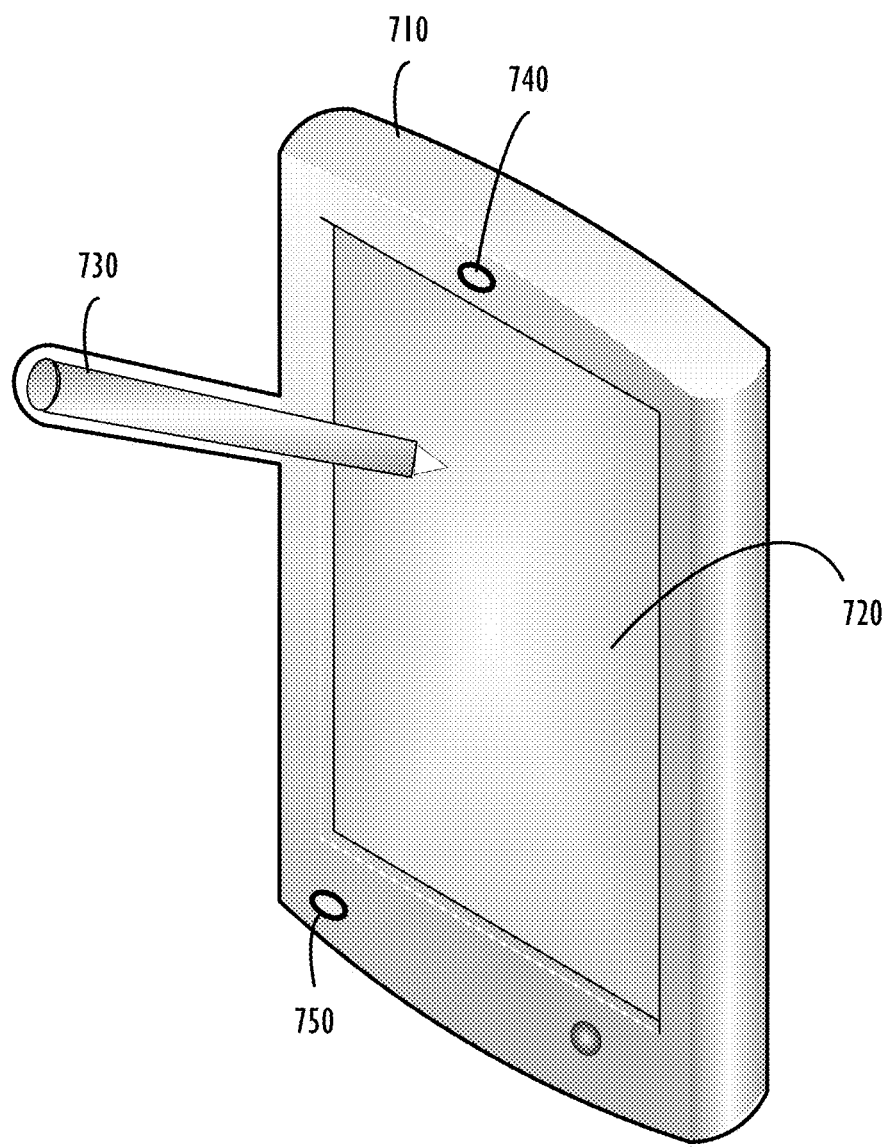
FIG. 7 illustrates a diagram of a tablet computer acceptable for practicing some of the disclosed embodiments.

Referring now to FIG. 7, tablet computer 710 represents an example device that may be suitably configured to perform aspects of the one or more disclosed embodiments. Tablet computer 710 may include one or more processing components as described above in the discussion of FIG. 6. Tablet 710 may include a touch screen 720, a front facing camera 740, a rear facing camera (not shown), an audio microphone 750, and optionally a stylus 730 for interacting with touch screen 720. Tablet computer 710 may also include capabilities to connect to a wired or wireless network or to other external devices through one or more communication interfaces (not shown).

In light of the principles and example embodiments described and illustrated herein, it will be recognized that the example embodiments may be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

This disclosure may include descriptions of various benefits and advantages that may be provided by various embodiments. One, some, all, or different benefits or advantages may be provided by different embodiments.

In view of the wide variety of useful permutations that may be readily derived from the example embodiments described herein, this detailed description is intended to be illustrative only, and should not be taken as limiting the scope of the invention.

What is claimed is:

1. A device, comprising:
   a processor;
   a memory communicatively coupled to the processor;
   one or more video capture devices communicatively coupled to the processor; and
   one or more sensors, wherein the memory stores instructions, that when executed by the processor cause the processor to:
       verify that a user is authenticated to the device, using only local information stored on the device;
       provide an examination or training session to the user using only local information stored on the device, the examination or training session each comprising a plurality of questions selected from one or more question banks;
       capture and locally store a plurality of metrics during the examination or training session, the plurality of metrics captured periodically and intermittently at a frequency unknown to the user, wherein the plurality of metrics comprise at least two of security metrics, performance metrics, and analytical metrics;
       determine an expectation of performance of the user based on previously stored performance metrics, the previously stored performance metrics associated with the user and collected during one or more previous training or mock examination sessions of the user;
       monitor actual performance of the user during a formal examination;
       compare the expectation of performance with the actual performance; and
       increase capture of security metrics for the formal examination or for another formal examination based on the actual performance exceeding the expectation of performance by a pre-determined threshold,
       wherein the security metrics comprise information, obtained from the one or more video capture devices or the one or more sensors, related to determining an identity of a person interacting with the device during the examination or training session,
       wherein the performance metrics comprise information related to the user's performance in answering the questions of the examination or training session, and
       wherein the analytic metrics comprise information, other than the security metrics, pertaining to a defined group of users, the information having commercial value or being useful for improving or evaluating training, the defined group of users belonging to a given category or entity, the category being a demographic, geographic, industry, market, or business category, and the entity being a manufacturing, production, supplier or marketing entity.

2. The device of claim 1, wherein the instructions further comprise instructions, that when executed by the processor cause the processor to:
   disable access to one or more applications on the device; and
   disable access to one or more communication interfaces, wherein both the one or more applications and one or more communication interfaces are disabled prior to initiating the examination or training session.

3. The device of claim 1, wherein the instructions further comprise instructions, that when executed by the processor cause the processor to:
   monitor performance of the user during one or more training sessions; and
   prompt the user to initiate an examination session based, at least in part, on the monitored performance.

4. The device of claim 1, wherein the one or more sensors comprise a global positioning system (GPS) and the analytical metrics comprise location of the device.

5. The device of claim 1, wherein after completion of a formal examination session the device is connected to a network and information regarding the plurality of metrics captured and locally stored during the one or more training sessions and the formal examination session is uploaded to a server for further analysis.

6. The device of claim 1, wherein the examination or training session is a mock or formal examination session and wherein the instructions further comprise instructions, that when executed by the processor cause the processor to:
   capture and locally store the security metrics during the mock or the formal examination session.

7. The device of claim 6, wherein the security metrics comprise:
   image capture from a front facing camera of the device;
   image capture from a rear facing camera of the device; and
   audio recording from a microphone.

8. The device of claim 1, wherein verification of the user comprises:
   capturing a picture or video of the user by using the one or more video capture devices;
   performing face recognition on the captured picture or video;
   storing the captured picture or video and results of face recognition locally on the device as stored authentication information; and
   associating the stored authentication information with a training or examination session and the authenticated user.

9. The device of claim 1, wherein verification of the user comprises:
   capturing a voice sample of the user by using a microphone;
   performing voice recognition on the captured voice sample;
   storing the captured voice sample and results of voice recognition locally on the device as stored authentication information; and
   associating the stored information with a training or examination session and the authenticated user.

10. The device of claim 1, wherein the examination or training session comprises a formal examination sesion and wherein the plurality of questions selected from one or more question banks comprise questions selected from a question bank only available for formal examination sessions.

11. The device of claim 1, wherein the one or more question banks comprise questions overlapping in subject matter content with no repeated questions in any different question bank.

12. The device of claim 1, wherein the plurality of metrics comprises security metrics and performance metrics.

13. The device of claim 1, wherein the plurality of metrics comprises security metrics and analytical metrics.

14. A method to provide one or more training or examination sessions, the method comprising:
verifying, using a processor, that a user is authenticated to a training device, using only local information stored on the training device;
providing an examination or training session to the user using only local information stored on the training device, the examination or training session each comprising a plurality of questions selected from one or more question banks;
capturing and locally storing a plurality of metrics during the examination or training session, the plurality of metrics captured periodically and intermittently at a frequency unknown to the user, wherein the plurality of metrics comprise at least two of security metrics, performance metrics, and analytical metrics;
determining an expectation of performance of the user based on previously stored performance metrics, the previously stored performance metrics associated with the user and collected during one or more previous training or mock examination sessions of the user;
monitoring actual performance of the user during a formal examination;
comparing the expectation of performance with the actual performance; and
increasing capture of security metrics for the formal examination or for another formal examination based on the actual performance exceeding the expectation of performance by a pre-determined threshold,
wherein the security metrics comprise information, obtained from one or more video capture devices or one or more sensors communicatively coupled to the training device, related to determining an identity of a person interacting with the device during the examination or training session,
wherein the performance metrics comprise information related to the user's performance in answering the questions of the examination or training session, and
wherein the analytic metrics comprise information, other than the security metrics, pertaining to a defined group of users, the information having commercial value or being useful for improving or evaluating training, the defined group of users belonging to a given category or entity, the category being a demographic, geographic, industry, market, or business category, and the entity being a manufacturing, production, supplier or marketing entity.

15. The method of claim 14, further comprising:
disabling access to one or more applications on the training device and disabling access to one or more communication interfaces of the training device prior to initiating the examination or training session.

16. The method of claim 14, further comprising:
monitoring performance of the user during one or more training sessions; and
prompting the user to initiate an examination session based, at least in part, on the monitored performance.

17. The method of claim 14, further comprising:
capturing a geographical position of the training device using an integrated global positioning system (GPS) sensor during the training or examination session.

18. The method of claim 14, further comprising:
connecting the training device to a network after completion of a formal examination session; and
uploading locally stored information regarding the plurality of metrics captured during one or more training sessions and the formal examination session to a server for further analysis.

19. The method of claim 14, further comprising:
capturing security metrics periodically and intermittently throughout a mock or formal examination session.

20. The method of claim 19, wherein the security metrics comprise:
image capture from a front facing camera of the training device;
image capture from a rear facing camera of the training device; and
audio recording from a microphone configured to provide audio information to the training device.

21. A non-transitory computer readable medium comprising instructions stored thereon that when executed by a processor of a training device cause the processor to:
verify that a user is authenticated to the training device using only local information stored on the training device;
provide an examination or training session to the user using only local information stored on the training device, the examination or training session each comprising a plurality of questions selected from one or more question banks;
capture and locally store a plurality of metrics during the examination or training session, the plurality of metrics captured periodically and intermittently at a frequency unknown to the user, wherein the plurality of metrics comprise at least two of security metrics, performance metrics, and analytical metrics;
determine an expectation of performance of the user based on previously stored performance metrics, the previously stored performance metrics associated with the user and collected during one or more previous training or mock examination sessions of the user;
monitor actual performance of the user during a formal examination;
compare the expectation of performance with the actual performance; and
increase capture of security metrics for the formal examination or for another formal examination based on the actual performance exceeding the expectation of performance by a pre-determined threshold,
wherein the security metrics comprise information, obtained from the one or more video capture devices or the one or more sensors, related to determining an identity of a person interacting with the device during the examination or training session,
wherein the performance metrics comprise information related to the user's performance in answering the questions of the examination or training session, and
wherein the analytic metrics comprise information, other than the security metrics, pertaining to a defined group of users, the information having commercial value or being useful for improving or evaluating training, the defined group of users belonging to a given category or entity, the category being a demographic, geographic, industry, market, or business category, and the entity being a manufacturing, production, supplier or marketing entity.

22. A device, comprising:

a processor;

a memory communicatively coupled to the processor;

one or more video capture devices communicatively coupled to the processor; and one or more sensors, wherein the memory stores instructions, that when executed by the processor cause the processor to:

verify that a user is authenticated to the device, using only local information stored on the device;

provide an examination or training session to the user using only local information stored on the device, the examination or training session each comprising a plurality of questions selected from one or more question banks;

capture and locally store a plurality of metrics during the examination or training session, the plurality of metrics captured periodically and intermittently at a frequency unknown to the user, wherein the plurality of metrics comprise security metrics, performance metrics, and analytical metric;

determine an expectation of performance of the user based on previously stored performance metrics, the previously stored performance metrics associated with the user and collected during one or more previous training or mock examination sessions of the user;

monitor actual performance of the user during a formal examination;

compare the expectation of performance with the actual performance; and increase capture of security metrics for the formal examination or for another formal examination based on the actual performance exceeding the expectation of performance by a pre-determined threshold, wherein the security metrics comprise information, obtained from the one or more video capture devices or the one or more sensors, related to determining an identity of a person interacting with the device during the examination or training session, wherein the performance metrics comprise information related to the user's performance in answering the questions of the examination or training session, and wherein the analytic metrics comprise information, other than the security metrics, pertaining to a defined group of users, the information having commercial value or being useful for improving or evaluating training, the defined group of users belonging to a given category or entity, the category being a demographic, geographic, industry, market, or business category, and the entity being a manufacturing, production, supplier or marketing entity.

* * * * *